(No Model.)
T. E. MURRAY.
COMBINED COCK AND COUPLING FOR BARRELS, &c.
No. 485,847. Patented Nov. 8, 1892.
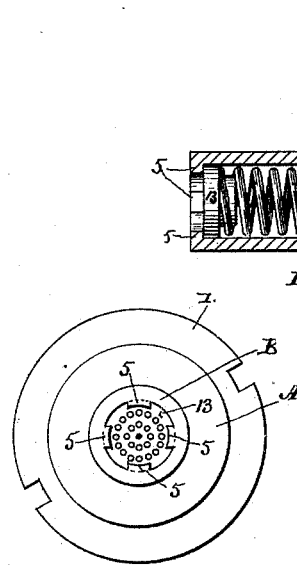
Fig. 1.
Fig. 2.
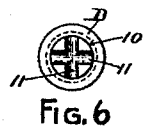
Fig. 6
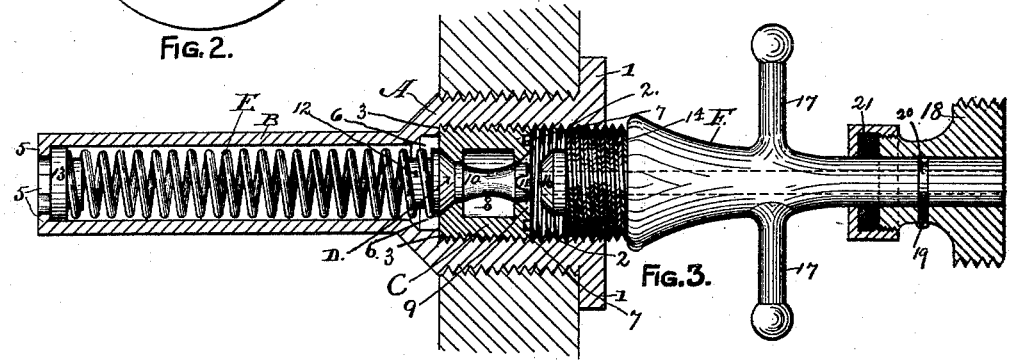
Fig. 3.
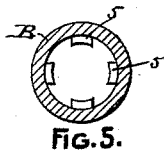
Fig. 5.
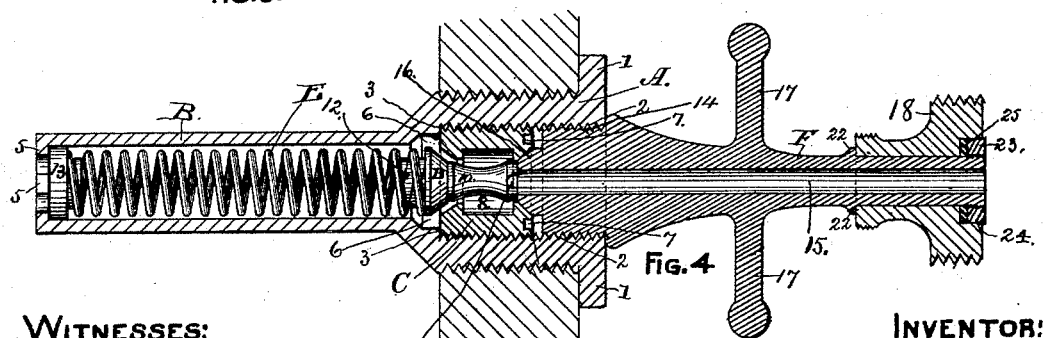
Fig. 4.
WITNESSES:
S. B. Brewer
Edmund Savage
INVENTOR:
Thomas E. Murray,
BY William K. Low,
ATTORNEY.

UNITED STATES PATENT OFFICE.

THOMAS E. MURRAY, OF ALBANY, NEW YORK, ASSIGNOR OF ONE-HALF TO EDWARD J. B. MURRAY, OF SAME PLACE.

COMBINED COCK AND COUPLING FOR BARRELS, &c.

SPECIFICATION forming part of Letters Patent No. 485,847, dated November 8, 1892.

Application filed June 25, 1891. Serial No. 397,480. (No model.)

*To all whom it may concern:*

Be it known that I, THOMAS E. MURRAY, of the city and county of Albany, in the State of New York, have invented new and useful Improvements in a Combined Cock and Coupling for Barrels, &c., of which the following is a specification.

My invention relates to improvements in appliances for drawing liquids under pressure from barrels and other closed vessels; and it consists of a metallic bushing permanently secured in the head or other convenient part of a barrel, said bushing having a screw-thread formed in its bore and a cylindrical extension of reduced diameter extending into the interior of the barrel and its inner end being provided with means for receiving a perforated seat for a spring, a removable valve-seat fitted to screw into said bushing, an inwardly-opening valve provided with a solid stem channeled on its outer end, fitted to close the opening through said valve-seat, a removable spring provided with a perforated seat at its inner end, and a tubular screw-threaded section fitted to screw into the outer end of said bushing to force open the valve, the outer end of said section being provided with part of a coupling in which the section is free to rotate, the parts contained in the bushing being all removable therefrom, so as to leave a clear opening into the interior of the barrel for the purpose of obtaining access thereto for effecting the cleansing of the same.

In the accompanying drawings, which are herein referred to and form part of this specification, Figure 1 is a longitudinal section of the bushing and removable valve-seat, the valve, spring, and perforated seat for the latter being shown in elevation. Fig. 2 is a detached end elevation of the inner end of the bushing. Fig. 3 is a longitudinal section of the bushing, removable valve-seat, and coupling, the valve, spring, and the tubular screw-threaded section being shown in elevation, the valve being shown in its closed position. Fig. 4 is a longitudinal section of the device with the valve in its open position and the spring shown in elevation, showing a slight modification in the tubular screw-threaded section. Fig. 5 is a transverse section of the bushing at the line X X on Fig. 1, showing the inward extension of said bushing without the spring and perforated seat for said spring; and Fig. 6 is an end view of the outer end of the valve detached from the device.

As represented in the drawings, A designates the metallic bushing of my device, which is provided with means for attaching the same to a barrel. Preferably the means employed consists of a screw-thread formed on the periphery of said bushing. Said bushing is tubular in form and has on its outer extremity a circumferential flange 1, fitted to overlap onto the adjoining part of the barrel, to which it is attached. The bore of said bushing is provided with a screw-thread 2, which extends from the outer end of the bushing to a shoulder 3, which forms a stop for the removable valve-seat of the device. A cylindrical extension B, of smaller diameter than the bushing A, is formed on the inner extremity of the latter, so that the two will be concentric with each other, and the inner end of said extension is provided with inturned lugs 5, which form an abutment for a spring, which exerts its pressure against the inner face of the valve of the device, so as to keep said valve in a normally-closed position. The outer end of the bore of said extension is enlarged, preferably, to form a chamber 6 to facilitate the flow of liquid through the device.

C designates the removable valve-seat of my device. Said valve-seat has on its periphery a screw-thread which corresponds with screw-thread 2 in the bore of the bushing A, into which said valve-seat is fitted to be screwed until its inner end bears against the shoulder 3, and for the purpose of affording means for applying a wrench to said valve-seat its outer face is provided with pits 7 for receiving the corresponding points of a tool fitted to rotate said valve-seat. The latter is preferably formed with a chamber 8 for giving ample room for the flow of liquid through the bore of said valve-seat. The inner end of said bore is tapered to form a seat for the valve, and the outer end of said bore is preferably counterbored, as at 9, for the purpose of receiving a corresponding projection on a tubular screw-threaded section used for opening the valve.

D designates the valve of my device, which is provided with a solid stem 10, whose outer end is provided with radial channels 11, through which the liquid escapes from the chamber 8 when said valve is forced open. At the inner end of said valve is provided a boss 12 or other suitable appliance for connecting a spring thereto.

E designates a spring which bears against the inner face of the valve D to hold the latter normally in a closed position. The inner end of said spring is attached to a perforated seat 13, which takes against the lugs 5 in the inner end of the extension B. The perforated seat 13 operates as a strainer to prevent hops or other foreign substances from entering into the bore of the extension B and thence out through the opening of the valve-seat C. The spring E should be of sufficient length to have a compression of it produced by screwing the removable valve-seat C down to its place, and said spring should have the strength required to press the valve D tightly to its place on the seat C.

F designates a tubular section provided with a screw-threaded boss 14, that is fitted to screw into the bore of the bushing A. The inner end of said section is provided with an extension 16, which enters the countersink 9 of the valve-seat C to take against the outer end of valve D, so as to force said valve away from its seat, and thereby open communication through the opening of the valve-seat. The channels 11 in the outer end of the valve D communicate with a longitudinal opening 15 of the section F, so as to carry off the liquid which passes through the valve-seat. The section F is provided with handles 17 or other suitable means for rotating said section to effect its connection and disconnection with the bushing A. A coupling-section 18 is revolubly attached to the outer extremity of the section F as a means for connecting a discharge-pipe thereto. As shown in Fig. 3, the said coupling-section is provided with a screw 19, which engages in circumferential groove 20 in the section F, and the coupling-section 18 is provided with a stuffing-box 21 for containing packing, so as to prevent a leakage of the liquid at that point.

In the modification shown in Fig. 4 the section F is provided with a circumferential rim 22, which forms a shoulder against which the inner end of the coupling-section 18 will have a bearing, and a circumferential flange 23 is secured to the outer extremity of the section F and is fitted to enter a counterbore 24 in the outer face of said coupling-section in such manner that while the latter will be left free to revolve on the section F it will thereby be prevented from displacement on said section. A packing 25 is fixed between the inner face of said flange and the bottom of the counterbore for the purpose of preventing leakage of the liquid at that point.

When the valve-seat C, valve D, and spring E, with its perforated seat 13, are removed from the bushing A, a clear opening through the device, as shown in Fig. 5, will be obtained for introducing a stream of water, whereby the interior of the barrel can be thoroughly cleansed.

My invention operates in the following manner: The bushing A and its attached parts being secured in a barrel containing liquid, the valve D being closed to open said valve, the section F is screwed into the outer end of the bushing A, and thereby the extension 16 will be carried into contact with the outer end of the valve D. A continued rotation of the section F will force the valve D inwardly away from its seat C, thereby allowing the liquid in the barrel to pass through the opening in the valve-seat C into the chamber 8 of said valve-seat. Thence the liquid passes through the channels 11 of the valve D into the opening 15 of the section F, from which it may be conveyed to any point by a discharge-pipe, which is coupled to said section. After the liquid is discharged from the barrel or at any other time the valve D will be automatically closed by the spring E, and thereby foul or musty air will be prevented from entering an empty barrel to contaminate it, so as to affect the succeeding filling of the barrel.

What I claim as my invention, and desire to secure by Letters Patent, is—

1. A metallic bushing A, provided with an internal screw-thread 2 and with an open-ended cylindrical extension B on its inner end, in combination with a removable annular valve-seat C, fitted to screw into said bushing and provided with an interior enlargement or chamber 8, an inwardly-opening valve D, fitted to close the opening through said valve-seat and provided with a solid stem 10, having radial channels 11 formed in its outer end, and a spring E, whose outer end is fitted to bear against the inner end of the valve D and whose inner end is connected to a removable perforated abutment 13, which forms a strainer at the inner end of said entension, said abutment, spring, valve, and valve-seat being removable through the outer end of said bushing, while the latter is secured in a barrel, whereby an unobstructed opening through said bushing can be obtained, as and for the purpose herein specified.

2. The combination of a metallic bushing A, provided with an internal screw-thread 2 and with an open-ended tubular extension B on its inner end, a removable annular valve-seat C, fitted to screw into said bushing and provided with an interior enlargement or chamber 8, an inwardly-opening valve D, fitted to close the opening through said valve-seat and provided with a solid stem 10, having radial channels 11 formed in its outer end, said channels forming an open communication through the valve-seat C with the tubular extension B when the valve D is pressed away from said valve-seat, a spring E, fitted to bear against the inner end of the valve D and having its opposite end connected to a removable perforated abutment 13, which forms a strainer at the inner end of the extension B, and a removable tubular section F, fitted to screw into the outer end of said bushing, so as to bear against the outer end of the valve D and effect the opening movement of the latter, said tubular section, valve-seat, valve, spring, and abutment being removable through the outer end of the bushing A, while the latter is secured in a barrel, whereby an unobstructed opening through said bushing can be obtained, as and for the purpose herein specified.

THOMAS E. MURRAY.

Witnesses:
 WM. H. LOW,
 S. B. BREWER.